United States Patent
Cooper et al.

(10) Patent No.: US 9,256,066 B2
(45) Date of Patent: Feb. 9, 2016

(54) LASER BEAM IRRADIANCE CONTROL SYSTEMS

(75) Inventors: Jeremy R. Cooper, Issaquah, WA (US); Steven A. Reese, Shoreline, WA (US); William M. Dougherty, Kenmore, WA (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 55 days.

(21) Appl. No.: 14/002,615

(22) PCT Filed: Jan. 16, 2012

(86) PCT No.: PCT/SE2012/050030
§ 371 (c)(1),
(2), (4) Date: Aug. 30, 2013

(87) PCT Pub. No.: WO2012/118425
PCT Pub. Date: Sep. 7, 2012

(65) Prior Publication Data
US 2013/0335798 A1    Dec. 19, 2013

Related U.S. Application Data

(60) Provisional application No. 61/447,711, filed on Mar. 1, 2011.

(51) Int. Cl.
*G02B 26/08* (2006.01)
*G02B 26/10* (2006.01)
*G02B 26/12* (2006.01)
*G02B 21/16* (2006.01)
*G02B 6/26* (2006.01)
*G02B 6/32* (2006.01)

(52) U.S. Cl.
CPC ................ *G02B 26/08* (2013.01); *G02B 6/266* (2013.01); *G02B 21/16* (2013.01); *G02B 26/0816* (2013.01); *G02B 26/0875* (2013.01); *G02B 26/105* (2013.01); *G02B 6/32* (2013.01); *G02B 2207/113* (2013.01)

(58) Field of Classification Search
CPC    G02B 6/266; G02B 6/12033; G02F 2203/48; G02F 1/0134; G01J 1/0418
USPC ........ 359/201, 205.1, 556, 857, 862; 385/140
See application file for complete search history.

(56) References Cited

U.S. PATENT DOCUMENTS

| | | |
|---|---|---|
| 4,516,827 A | 5/1985 | Lance et al. |
| 6,149,278 A | 11/2000 | Mao et al. |

(Continued)

FOREIGN PATENT DOCUMENTS

| | | |
|---|---|---|
| EP | 1536265 | 6/2005 |
| WO | WO 03/036348 | 5/2003 |
| WO | WO 03/042733 | 5/2003 |

(Continued)

*Primary Examiner* — Mahidere Sahle
(74) *Attorney, Agent, or Firm* — Sutherland Asbill & Brennan LLP

(57) ABSTRACT

Irradiance control systems ("ICSs") that control the irradiance of a beam of light are disclosed. ICSs include in a beam translator and a beam launch. The beam translator translates the beam substantially perpendicular to the propagating direction of the beam with a desired displacement so that the beam launch can remove a portion of the translated beam and the beam can be output with a desired irradiance. The beam launch attenuates the irradiance of the beam based on the amount by which the beam is translated. ISCs can be incorporated into fluorescent microscopy instruments to provide high-speed, fine-tune control over the irradiance of excitation beams.

20 Claims, 13 Drawing Sheets

(56) References Cited

U.S. PATENT DOCUMENTS

| | | | |
|---|---|---|---|
| 6,594,076 B2 * | 7/2003 | Satou | 359/388 |
| 2002/0113200 A1 | 8/2002 | Hajjar et al. | |
| 2003/0099454 A1 | 5/2003 | Chang | |
| 2005/0146784 A1 * | 7/2005 | Vogt | 359/368 |

FOREIGN PATENT DOCUMENTS

| | | |
|---|---|---|
| WO | 2008/009581 | 1/2008 |

\* cited by examiner

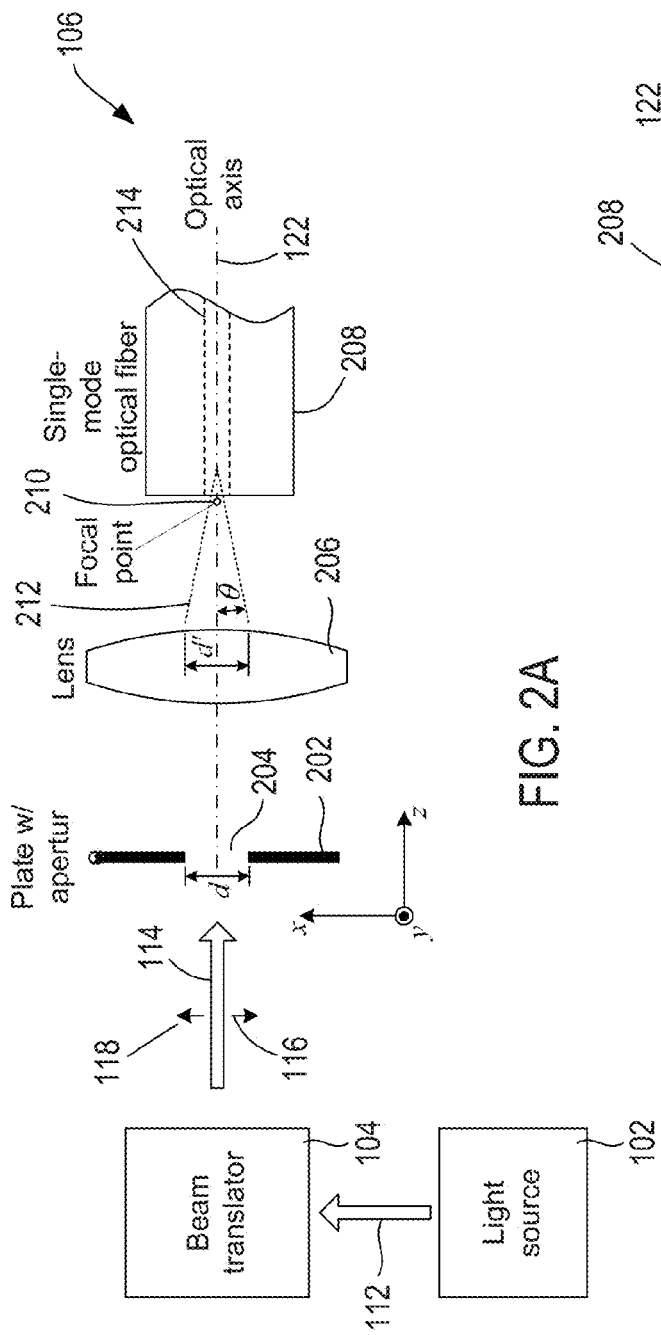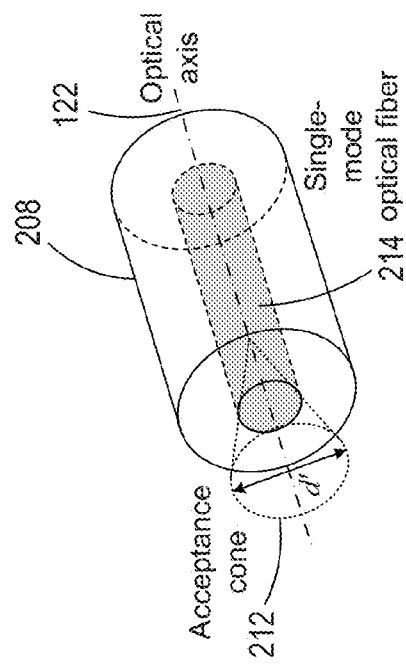

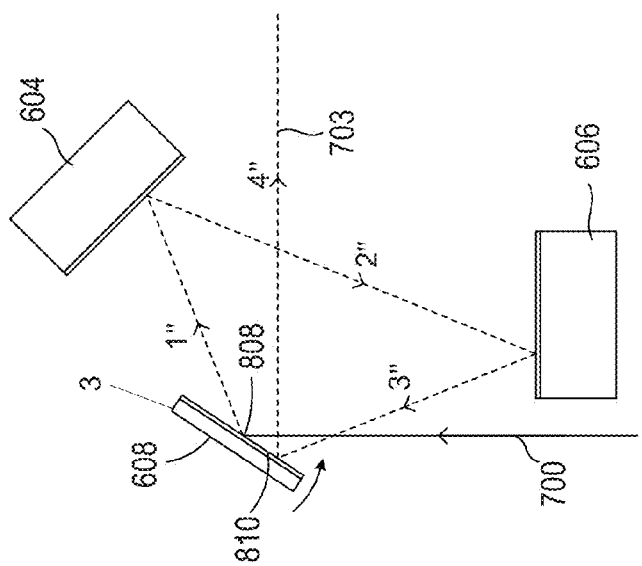
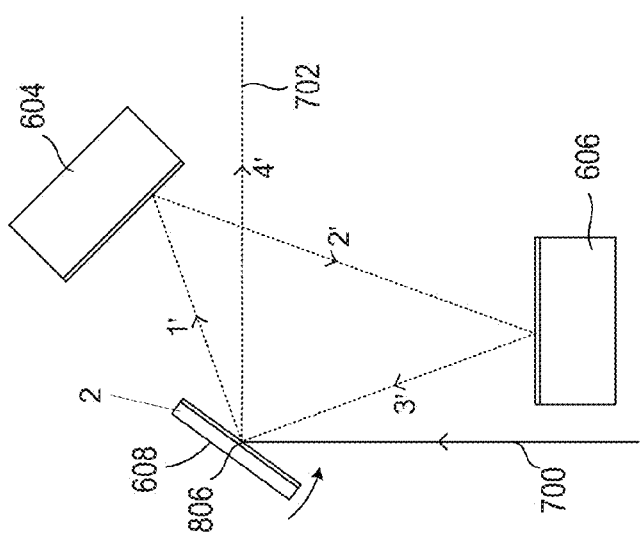
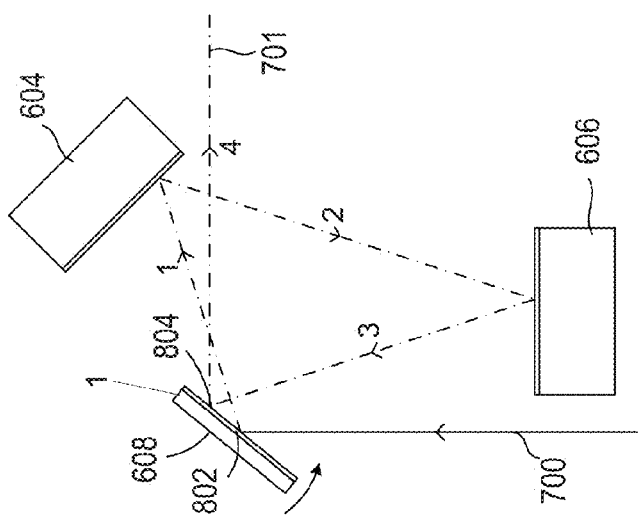

LASER BEAM IRRADIANCE CONTROL SYSTEMS

CROSS-REFERENCE TO A RELATED APPLICATION

This application is a filing under 35 U.S.C. 371 of international application number PCT/SE2012/050030, filed Jan. 16, 2012, published on Sep. 7, 2012 as WO 2012/118425, which claims the benefit of Provisional Application No. 61/447,711; filed Mar. 1, 2011.

TECHNICAL FIELD

This disclosure relates to external systems for laser beam irradiance adjustment and control.

BACKGROUND

Laser beam irradiance adjustment and control can be difficult to achieve over an irradiance range of one order of magnitude or more. Even within this range, the accuracy and stability in the irradiance of the light output from a typical laser is often suboptimal for certain applications. Typical solutions for controlling the irradiance of a laser include controlling the current applied to the source or placing neutral density filters in the laser beam path to reduce the beam irradiance. In recent years, laser shutters have been optimized for speed by reducing the size of the shutters and by increasing the electrical power used to the control the shutters. As a result, laser shutters can be placed in the laser beam path to turn the laser beam "on" and "off."

However, current control, density filtering, and use of shutters to adjust and control the irradiance of a laser beam is not optimal, especially when adjusting the laser on the sub-millisecond time scale is desired. For instance, the response time of a laser to a linearly controlled power source is typically non-linear, which limits the range of adjustability to about one order of magnitude. In addition, the temperature of a typical laser may fluctuate during operation, resulting in further irradiance instability. Neutral density filters may improve the irradiance range by several orders of magnitude, but filters provide only coarse irradiance adjustment, and typical high speed shutters are not capable of achieving sub-millisecond open and close times despite the reduced size of the aperture and higher driving voltages. For the above described reasons, engineers and scientists who develop and work with instruments that relay on high-speed control of laser light irradiance continue to seek mechanisms for laser beam irradiance adjustment and control on the sub-millisecond time scale.

SUMMARY

Irradiance control systems ("ICSs") that control the irradiance of a beam of light are disclosed. ICSs include in a beam translator and a beam launch. The beam translator translates the beam substantially perpendicular to the propagating direction of the beam with a desired displacement so that the beam launch can remove a portion of the translated beam and the beam can be output with a desired irradiance. The beam launch attenuates the irradiance of the beam based on the amount by which the beam is translated. ISCs can be incorporated into fluorescent microscopy instruments to provide high-speed, fine-tune control over the irradiance of excitation beams.

DESCRIPTION OF THE DRAWINGS

FIGS. 2A-2B shows a schematic representation of an example implementation of a beam launch of an irradiance control system and an isometric view of a single-mode optical fiber and associated acceptance cone.

FIGS. 8A-8C show snapshots of internal paths associated with a beam of light traveling through the beam translator shown in FIG. 6.

DETAILED DESCRIPTION

Figure 1:
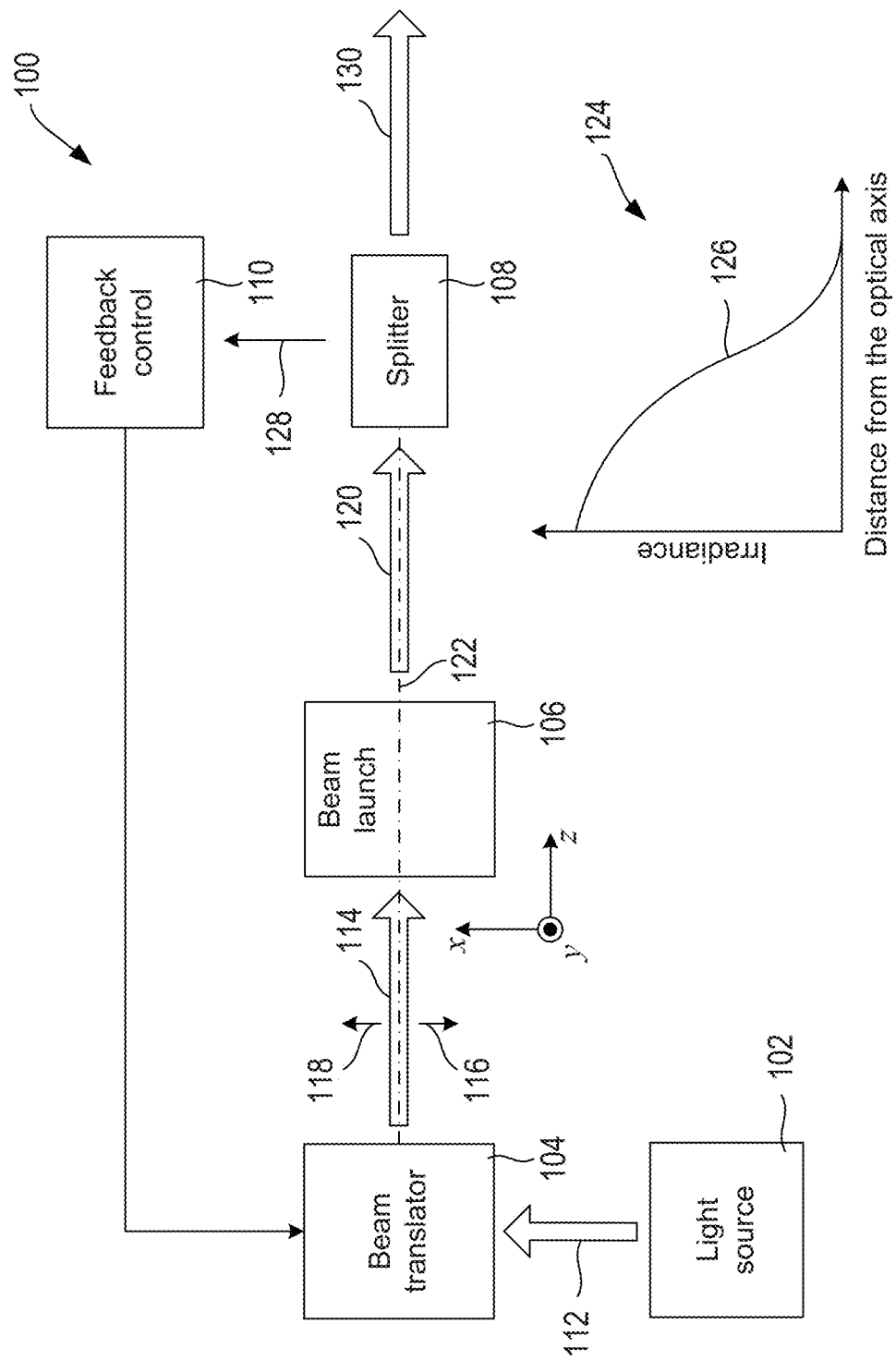
FIG. 1 shows a schematic representation of an example irradiance control system.

FIG. 1 shows a schematic representation of an example irradiance control system ("ICS") 100. The ICS 100 includes a beam translator 104, a beam launch 106, a splitter 108 and a feedback control 110. Directional arrow 112 represents a beam of collimated light output from a light source 102 to the beam translator 104. Directional arrow 114 represents the beam output from the translator 104 which propagates in the z-direction and is input to the launch 106. The translator 104 translates or shifts the beam 114 substantially perpendicular to the propagation direction of the beam 114, such as in the x-direction as indicated by directional arrows 116 and 118. Directional arrows 120 represent the beam output from the launch 106 which attenuates the irradiance of the input beam 114 based on the amount by which the beam 114 is translated by the translator 104. For example, dashed line 122 represents the optical axis of the launch 106. The farther the input beam 114 is translated away from the optical axis 122, the smaller the irradiance of the output beam 120. FIG. 1 includes an example plot 124 of the irradiance of the output beam 120 versus the distance from the center of the input beam 114 to the optical axis 122. Curve 126 represents how the irradiance of the output beam 120 decreases as the input beam 114 is translated away from the optical axis 122. In this example plot, the irradiance of the output beam 120 is greatest when the center of the input beam 114 is coincident with the optical axis 122 and the irradiance of the output beam 120 approaches zero, or is turned "off," as the input beam 114 is translated away from the optical axis 122.

As shown in FIG. 1, the splitter 108 is located in the path of the output beam 120 to reflect a portion 128 of the output beam 120 to the feedback control 110 and transmits the bulk of the irradiance in the output beam 130. The splitter 108 can be a beamsplitter cube or partially silvered mirror. The feedback control 110 is an electronic device that controls the operation of the translator based on the irradiance of the portion 128. The feedback control 110 includes a photodetector, such as a photodiode, a processor and memory. The feedback control 110 continuously monitors the irradiance of the portion 128 to determine whether or not the irradiance in the output beam 120 has changed and adjusts the irradiance of the beam 120 accordingly. When the irradiance of the portion 128 is outside selected minimum and maximum irradiance thresholds, the control 110 sends electronic signals to the translator 104 to translate the input beam 114 so that the irradiance of the portion 128 is within the minimum and maximum irradiance thresholds. For example, when the irradiance of the portion 128 falls below the minimum threshold, the feedback control 110 sends signals to the translator 104 to translate the beam toward the optical axis 122. On the other hand, when the irradiance of the portion 128 exceeds the maximum threshold, the feedback control 110 sends signals to the translator 104 to translate the beam away from the optical axis 122. Alternatively, the feedback control 110 can direct the beam translator 104 to vary the irradiance in the beam 120. For example, the feedback control 110 can direct the translator 104 to shift the beam 114 back and forth to produce a desired modulated irradiance pattern in the beam 120. For example, the beam 120 may have a sinusoidal wave pattern or can be modulated to encode information.

FIG. 2A shows a schematic representation of an example implementation of the beam launch 106. The launch 106 includes a plate 202 with a circular aperture 204, a lens 206, and a single-mode optical fiber 208. As shown in FIG. 2A, the center of the aperture 206, optical axis of the lens 206, and optical axis of the fiber 208 are coincident to form the optical axis 122 of the launch 106 described above. In the example of FIG. 2A, the lens 206 is positioned along the optical axis 122 so that the focal point 210 of the lens 206 lies along the optical axis 122 and the diameter d' of the acceptance cone 212 of the fiber 208 at the lens 206 is approximately equal to the diameter of the aperture 204 (i.e., d≈d'). The diameter of the acceptance cone 212 is determined by the acceptance angle θ with the optical axis 122, which is correlated with numerical aperture of the fiber 208. FIG. 2B shows an isometric view of the fiber 208 and the acceptance cone 212. Light focused onto the focal point 210 lies within the acceptance cone 212 and is confined to the core 212. In other words, the lens 206 shapes the beam of light output from the aperture 204 so that the light lies within the acceptance cone 212.

Figure 3A:
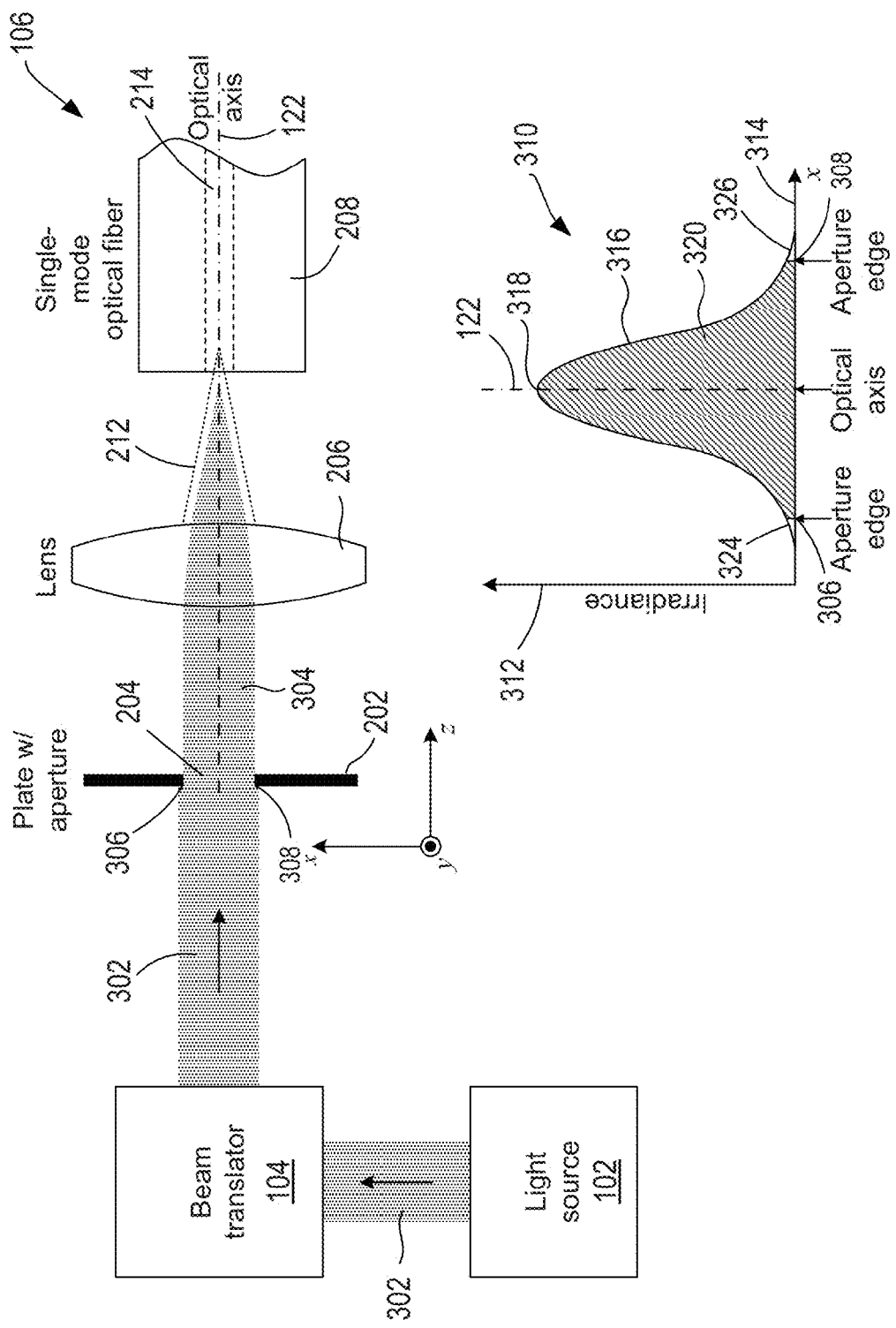
FIGS. 3A-3C show an example demonstration of a beam translator and beam launch of an irradiance control system.
Figure 3B:
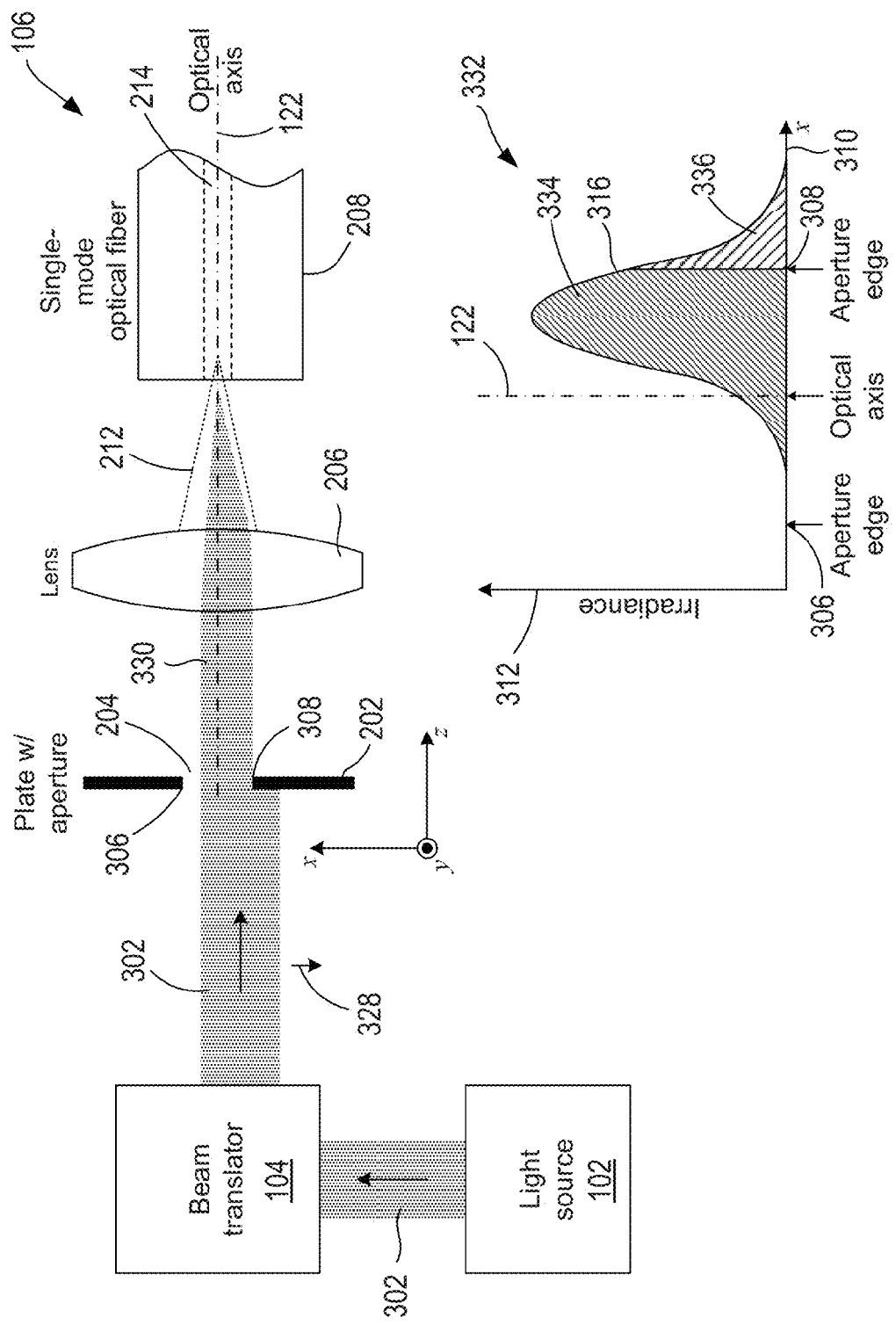
Figure 3C:
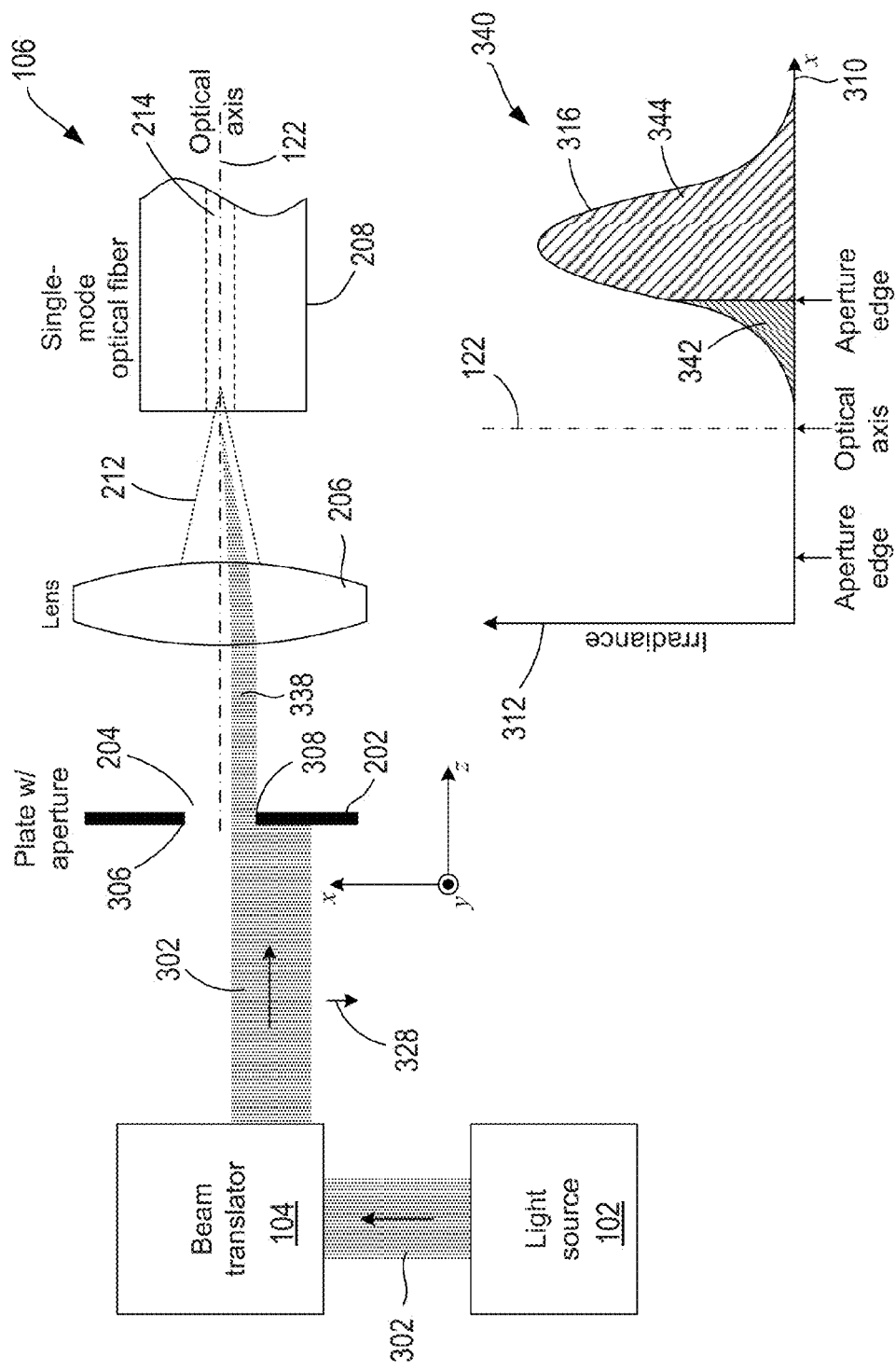

FIGS. 3A-3C show an example demonstration of the beam translator 104 and launch 106 operated to adjust the irradiance of a beam of light 302 output from the source 102. As shown in FIGS. 3A-3C, the translator 104 redirects the collimated beam 302 toward the launch 106 parallel to the optical axis 122. In order to achieve maximum coupling efficiency of the light into the fiber 208, the diameter of the beam 302 is tuned to approximately match the diameter of acceptance cone 212 of the fiber 208. In the example of FIG. 3A, the translator 104 translates the beam so that the center of the beam 302 is coincident with the optical axis 122. As a result, outer portions of the beam 302 are cut off or clipped by the plate 202 around the edge of the aperture 204, such as at aperture edge points 306 and 308, to produce a slightly narrower beam 304. The lens 206 focuses the beam 304 into a shape that lies substantially within the acceptance cone 212 of the fiber 208 so that the beam 304 enters the core 214. FIG. 3A includes an irradiance plot 310 associated with the beams 302 and 304. Vertical axis 312 represents the irradiance, and horizontal axis 314 represents the distance through the center of the beams 302 and 304 in the x-direction. Curve 316 represents a Gaussian-shaped irradiance distribution profile through the center of the beam 302 in the x-direction. In the example of FIG. 3A, the beam 302 is output from the translator 104 so that the highest irradiance portion of the beam is coincident with the optical axis 122, which is represented by peak 318 coincident with the optical axis 122. The total area under the curve 316 represents the irradiance of the beam 302 along the x-axis. Shaded area 320 under the curve 316 represents the irradiance of the beam 304 along the x-axis. Unshaded tails 324 and 326 represent the irradiance of the beam 302 that is cut off or clipped by the plate 202 around the aperture 204. As a result, the irradiance of the beam 304 entering the core 214 is less than the irradiance of the beam 302.

In FIG. 3B, the translator 104 translates the beam 302 in the direction 328 so that the center of the beam 302 is off the optical axis 122. In this example, a large outer portion of the beam 302 is cut off by the plate 202 around the edge of the aperture 204 to produce a narrower beam 330. The lens 206 focuses the beam 330 into a shape that lies substantially within the acceptance cone 212 of the fiber 208 so that the beam 330 enters the core 214. FIG. 3B includes an irradiance plot 332 with the curve 316 shifted away from the optical axis 122 to represent the irradiance profile of the beams 328 and 330. Shaded area 334 under the curve 316 represents the irradiance of the beam 330 along the x-axis. Shaded area 336 represents the irradiance portion of the beam 302 cut off by the plate 202. Plot 332 reveals that the highest irradiance portion of the beam 330 is located away from the optical axis 122 and the irradiance of the beam 330 entering the core 214 is significantly less than the irradiance of the beam 302.

In FIG. 3C, the translator 104 translates the beam 302 still farther in the direction 328 resulting in a significant portion of the beam 302 being cut off by the plate 202 to produce a very narrow beam 338. The lens 206 focuses the beam 338 into a shape that lies substantially within the acceptance cone 212 of the fiber 208 so that the beam 338 enters the core 214. FIG. 3B includes an irradiance plot 340 with the curve 316 shifted away from the optical axis 122 to represent the irradiance profile of the beam 338. Shaded area 342 under the curve 314 represents the irradiance of the beam 334 along the x-axis. Shaded area 344 represents the irradiance portion of the beam 302 cut off by the plate 202. Plot 340 reveals that the beam 302 is output from the translator 104 with much of the irradiance of the beam 302 cut off by the plate 202 leaving the beam 338 to enter the core 214 with a much smaller irradiance than the beam 302.

Allowing the beam 302 to strike the plate 202 to cut off a portion of the beam 302 irradiance, as described above with reference to FIGS. 3A-3C, may result in unacceptable scattering. In alternative embodiments, the plate 202 may also include an angled reflective surface or mirror (not shown) located around a portion of the aperture 204 used to cut off the light. The mirror can be angled and configured to reflect the portion of the beam 302 to be cut off by the plate 202 to an optical beam dump (not shown) with high power handling capabilities. For example, the beam dump can be a cone of aluminum anodized to a black color and enclosed in a canister with a black, ribbed interior. Only the point of the cone is exposed to the reflected beam so that most of the reflected light grazes the cone at an angle. Any reflections from the black surface are then absorbed by the canister.

The single-mode optical fiber 208 provides spatial filtering of the asymmetrical beams output from the lens 206. For example, as described above with reference to FIGS. 3B and 3C, the beams 330 and 338 have asymmetrical irradiance distributions when the beams enter the core 214 of the fiber 208. Because the fiber 208 is a single-mode optical fiber, even though the beams enter the fiber 208 with asymmetrical irradiance distributions, the beams are output at the opposite end of the fiber 208 with symmetrical irradiance distributions.

Figure 4A:
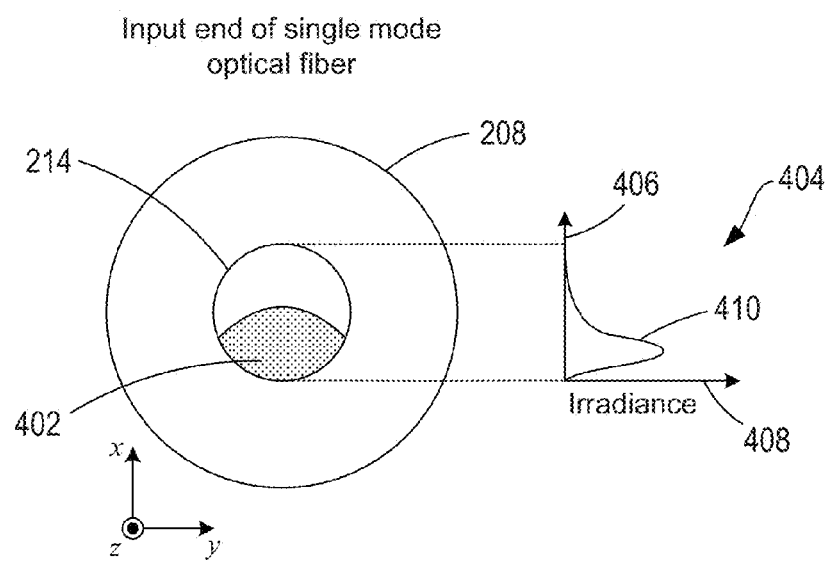
FIGS. 4A-4B show irradiance profiles for light input and output from a single-mode optical fiber.
Figure 4B:
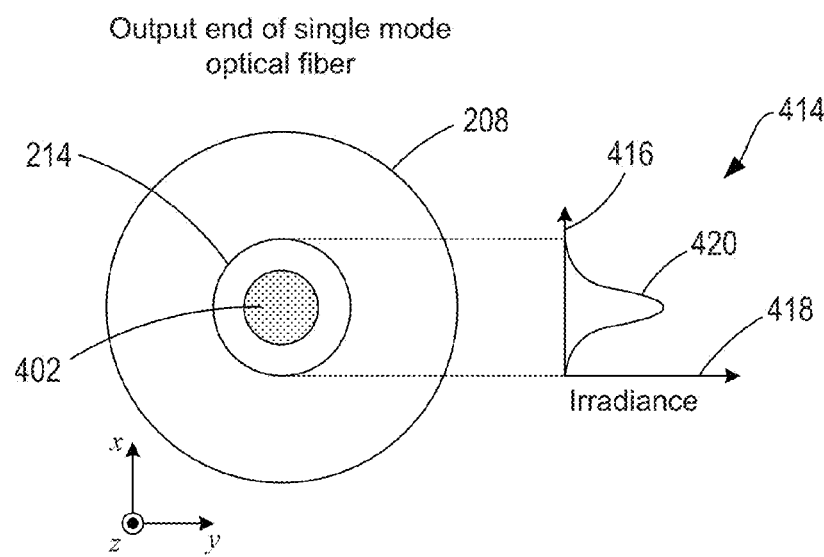

FIGS. 4A-4B show input and output ends, respectively, of the fiber 208. In FIG. 4A, the input end of the optical fiber is located along the optical axis 122 facing the lens 206 as shown in FIGS. 2-3. Shaded area 402 represents a region of the core 214 occupied by the largest irradiance portion of an asymmetrical beam input to the fiber 208. FIG. 4A includes a plot 404 of the irradiance profile associated with the beam input to the core. Vertical axis 406 represents the distance across the core 214 in the x-direction, horizontal axis 408 represents the irradiance, and curve 410 represents the irradiance of the asymmetrical beam that enters the input end of the fiber 208. Plot 404 reveals that largest portion of the irradiance of the input beam is located away from the center of the core 214. In FIG. 4B, shaded area 412 represents a region of the core 214 occupied by the largest irradiance portion of the beam output from the fiber 208. FIG. 4B includes a plot 414 of the irradiance profile associated with the beam output from the core 214. Vertical axis 416 represents the distance across the core 214 in any direction, horizontal axis 418 represents the irradiance, and curve 420 represents the irradiance of the beam output from the fiber 208. Plot 414 shows a symmetrical irradiance profile for the beam output from the fiber 208.

Figure 5:
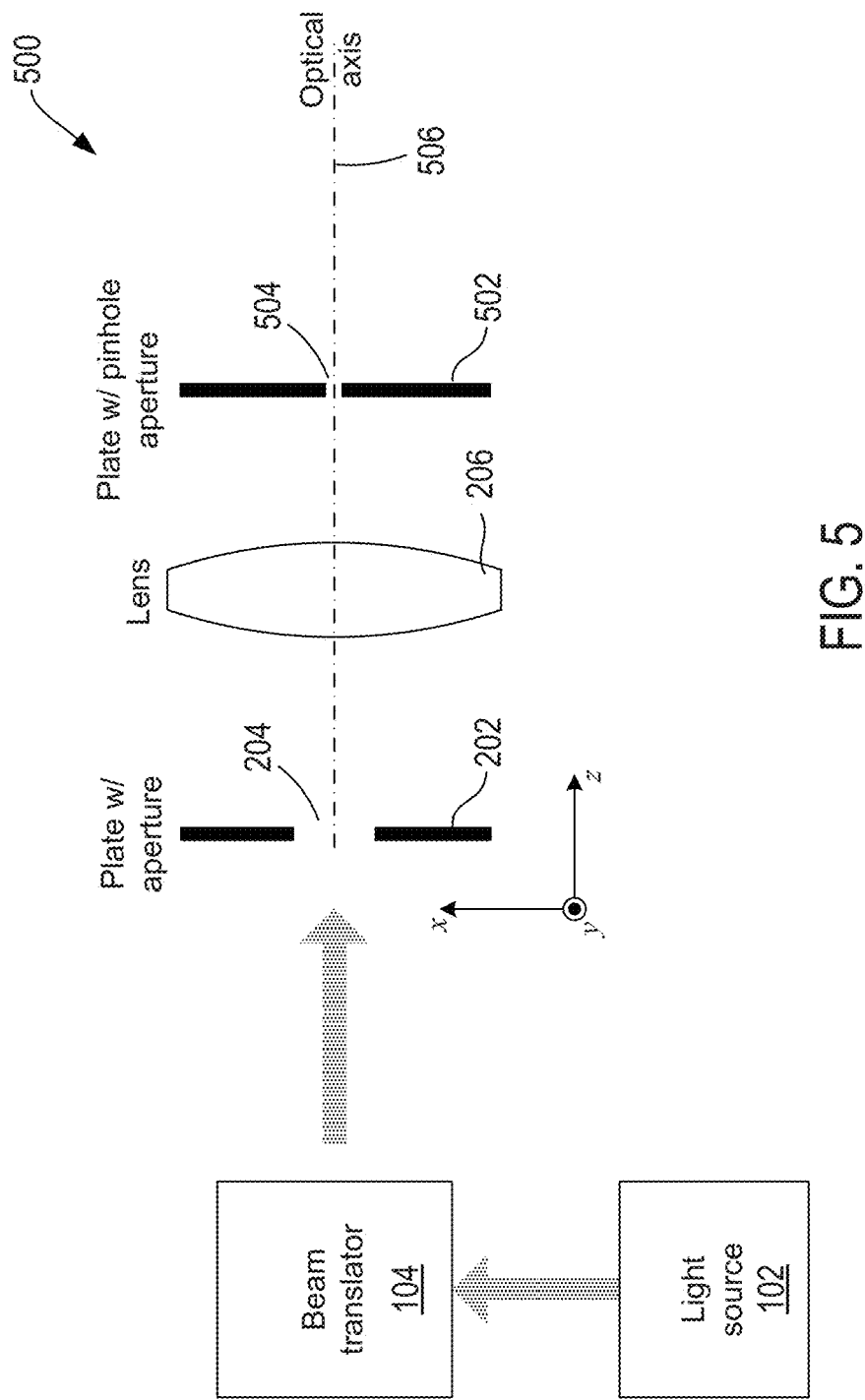
FIG. 5 shows a schematic representation of an example implementation of a beam launch of an irradiance control system.

In alternative embodiments, the single-mode optical fiber of the beam launch can be replaced by a plate with a diffraction-limited pinhole aperture, also referred to as a spatial filter. FIG. 5 shows a schematic representation of an example implementation of a beam launch 500. The launch 500 is similar to the launch 106 described above but with the single-mode optical fiber 208 replaced by a plate 502 with a circular pinhole sized aperture 504. As shown in FIG. 5, the centers of the apertures 204 and 504 are located along the optical axis 506 of the lens 206, which is also the optical axis of the launch 500. The aperture 504 is a diffraction-limited aperture with a diameter approximately that of a single-mode fiber core. For example, the diameter of the aperture 504 can range from approximately 3-4 microns.

Figure 6A:
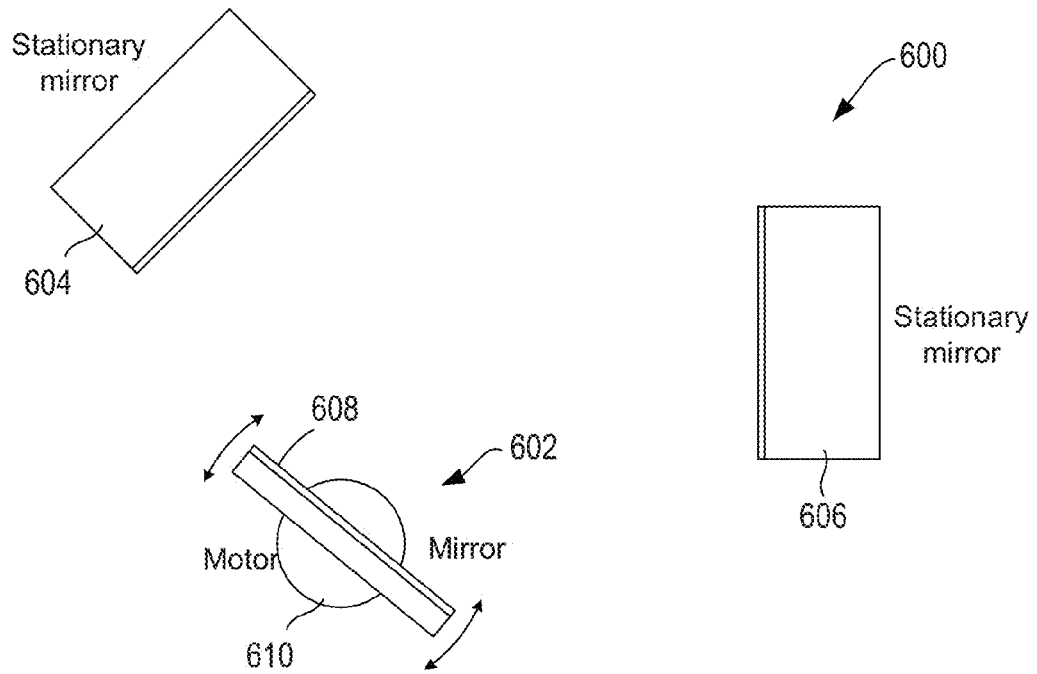
FIGS. 6A-6B show a top-plan view and an isometric view of an example beam translator.
Figure 6B:
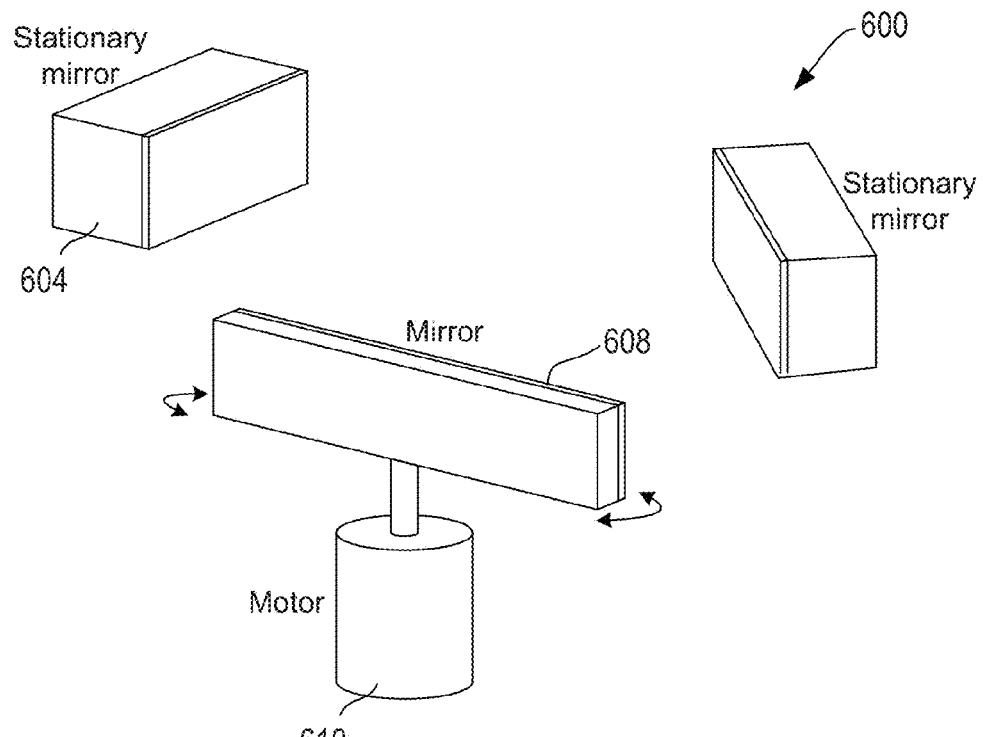

FIGS. 6A-6B show a top-plan view and an isometric view of an example beam translator 600. The translator 600 includes a scanning mirror 602, a first flat stationary mirror 604 and a second flat stationary mirror 606. The reflective surface of the first mirror 604 is angled toward the region between the scanning mirror 602 and fixed mirror 606, and the reflective surface of the second mirror 606 is angled toward the region between the scanning mirror 602 and the first mirror 604. The reflective surfaces of the mirrors 604, 606 and 608 are substantially perpendicular to the same plane with the mirror rotated about an axis that is perpendicular this plane. In the example of FIGS. 6A-6B, the scanning mirror 602 is a galvanometer mirror that includes a flat pivot mirror 608 attached to a rotatable shaft of a motor 610, which can be a galvanometer motor or a stepper motor. Alternatively, the scanning mirror can be a piezoelectric controlled mirror. As shown in FIGS. 6A-6B, the mirror 608 is continuously rotated back and forth by the motor 610 through a range of angles. Because the beam translator 600 is composed of mirrors and not lenses, the translator 600 is essentially achromatic. In other words, the translator 600 operates the same for all wavelengths without chromatic aberrations.

Figure 7:
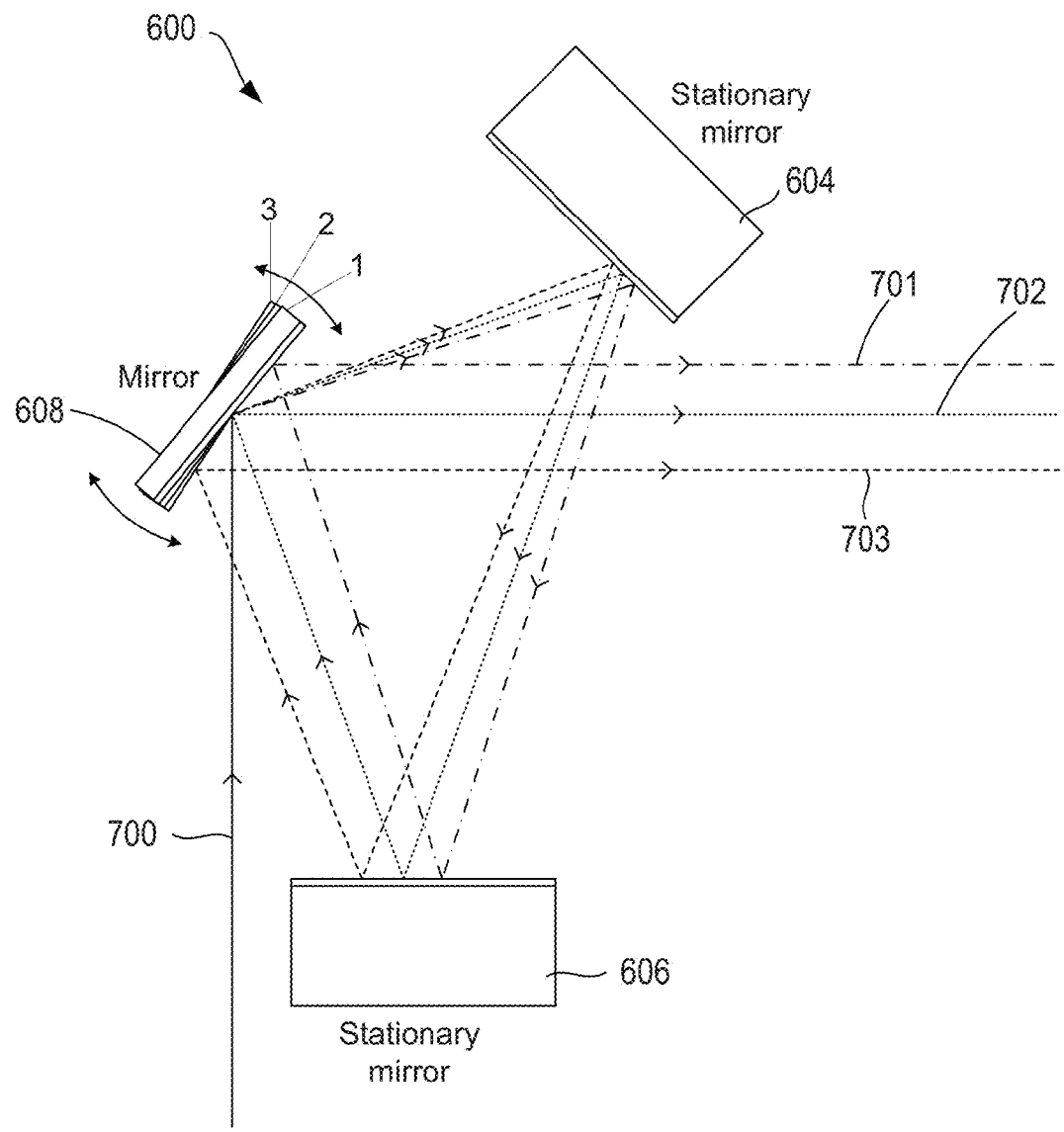
FIG. 7 shows as example demonstration of the beam translator shown in FIG. 6.

FIG. 7 shows a top-plan view of the beam translator 600 in operation. A beam of light 700, such as a beam of light output from the light source 102 as described above, is directed toward the mirror 608. FIG. 7 shows the mirror 608 rotated in three positions 1, 2 and 3, which represent just three of a continuum of rotational positions for the mirror 608. Differently patterned lines 701-703 represent three different paths the beam 700 travels through the translator 600 when the pivot mirror 608 is rotated into one of the three positions 1, 2 and 3, respectively. The reflections off of the mirrors 604, 606 and 608 are coplanar. As shown in the example of FIG. 7, the stationary mirrors 604 and 606 and the pivot mirror 608 are positioned so that the beam is output along one of three substantially parallel paths via four reflections. In other words, the mirror 608 can be rotated into any one of a continuum of positions that result in the beam being output from the translator 600 after four reflections along one of a continuum of substantially parallel paths. The amount by which the paths 701-703 are separated is determined by the amount by which the mirrors 604, 606 and 608 are separated. In general, the farther the mirrors 604, 606 and 608 are spaced apart, the greater the translation. Ideally the output paths along which the output beam can travel are parallel or non-intersecting, but in practice, it is recognized that the paths may be only approximately parallel or intersect at very long distances away from the translator 600 due to slight variations in the relative placement and orientation of the mirrors. As a result, the paths along which the beam can be output from the translator 600 are referred to as approximately parallel.

For each rotational position of the pivot mirror 308 that results in the beam 700 being placed on one of the parallel paths, the beam 400 is reflected off of the pivot mirror 308 two times, the first stationary mirror 304 one time, and the second stationary mirror 306 one time for a total of four reflections. FIGS. 8A-8C show snapshots of internal paths the beam 700 traveling through the translator 600 when the pivot mirror 608 is rotated into the three positions 1, 2 and 3, respectively. In FIG. 8A, the pivot mirror 608 is rotated into position 1. The beam 700 strikes the pivot mirror 608 at the point 802 and undergoes four reflections off of the mirrors 604, 606 and 608 with the reflections numbered sequentially 1, 2, 3 and 4. The $4^{th}$ reflection off of the pivot mirror 608 at the point 804 places the beam on the path 701 also shown in FIG. 7. In FIG. 8B, the pivot mirror 608 is rotated into position 2. The beam 700 strikes the pivot mirror 608 at the point 806 and undergoes four reflections off of the mirrors 604, 606 and 608 with the reflections numbered sequentially 1', 2', 3' and 4'. The $4^{th}$ reflection off of the pivot mirror 608 near the point 806 places the beam on the path 702 also shown in FIG. 7. In FIG. 8C, the pivot mirror 608 is rotated into position 3. The beam 700 strikes the pivot mirror 608 at the point 808 and undergoes four reflections off of the mirrors 604, 606 and 608 with the reflections numbered sequentially 1", 2", 3" and 4". The $4^{th}$ reflection off of the pivot mirror 608 at the point 810 places the beam on the path 703 also shown in FIG. 4.

When the beam translator 600 is implemented with a galvanometer mirror for the scanning mirror 602 sub-millisecond translation of the output beam is attainable, while typical shuttering times are around 0.2 milliseconds. Additionally, the translator 600 provides an effective means of implementing power control and power stabilization when optical feedback is present, as described above with reference to FIG. 1. Precise power control with at least 2 orders of magnitude of dynamic range and 0.1 millisecond time or faster is also attainable.

Figure 9A:
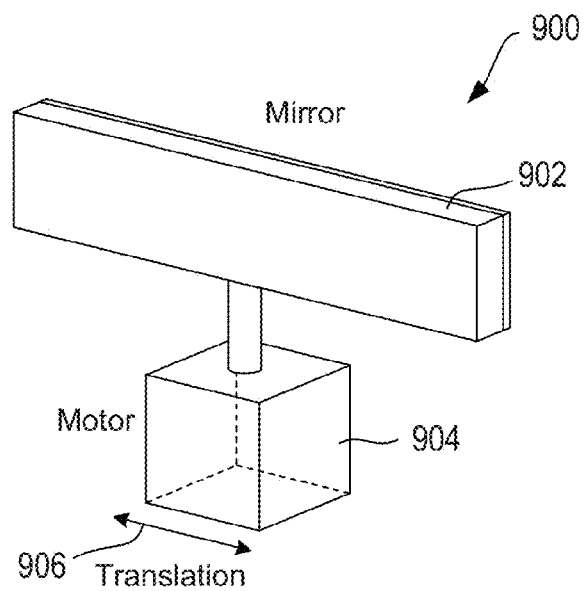
FIG. 9A shows an isometric view of an example beam translator.
Figure 9B:
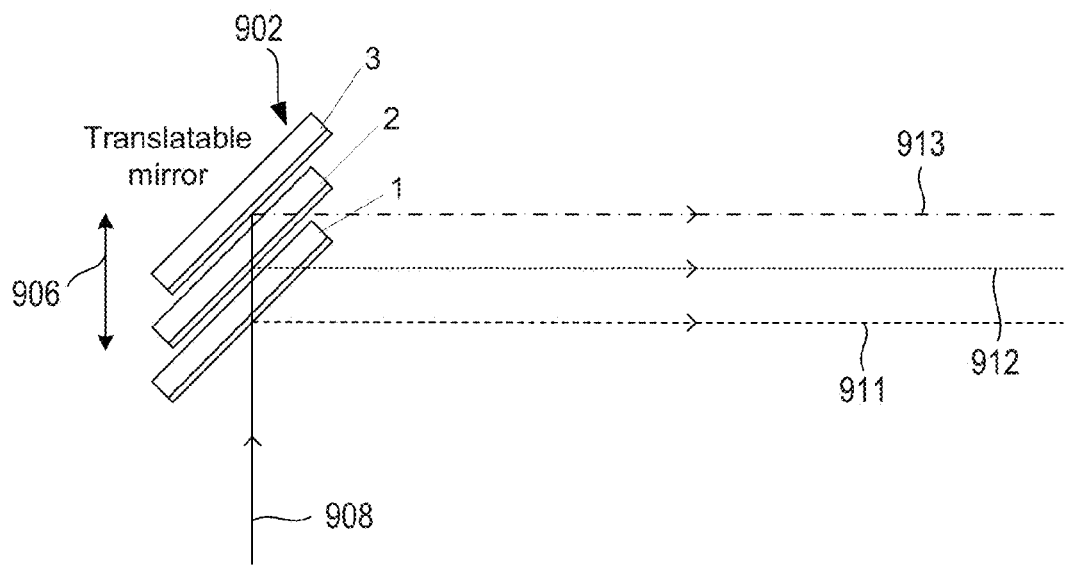
FIG. 9B shows as example demonstration of the beam translator shown in FIG. 9A.

FIG. 9A shows an isometric view of an example beam translator 900. The translator 900 is a scanning mirror disposed on a track (not shown). The scanning mirror includes a fixed flat pivot mirror 902 attached to a motor 904 that translates the mirror 902 back and forth along the track, as indicated by directional arrow 906. The mirror 902 is oriented so that the beam of light output from a light source strikes the mirror at a non-normal angle of incidence. FIG. 9B shows the translator 900 in operation with the mirror 902 fixed at a 45° angle with respect to of an incident beam 908. In the example of FIG. 9B, the mirror 902 is moved into three different positions 1, 2 and 3, which represent just three of a continuum of positions. Differently patterned lines 911-913 represent different substantially parallel paths the beam 910 is reflected into when the mirror 902 is translated into the three positions 1, 2 and 3, respectively. The beam translator 900 uses the mirror 902 to translate the beam 908 and, as a result, is also essentially achromatic.

Figure 10A:
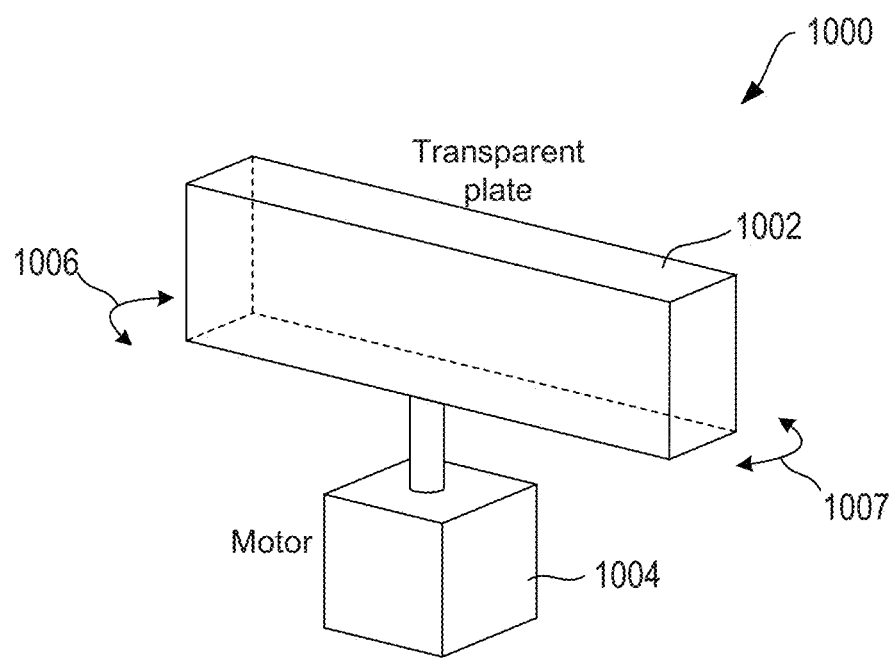
FIG. 10A shows an isometric view of an example beam translator.
Figure 10B:
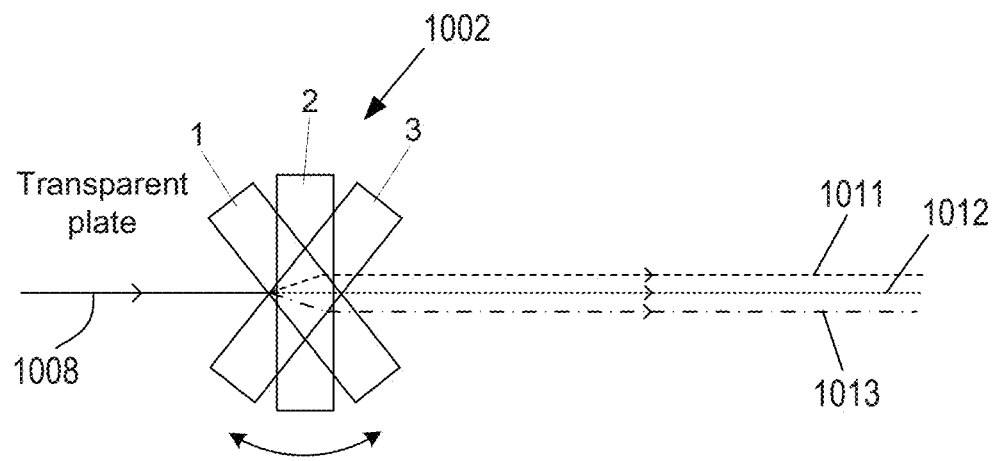
FIG. 10B shows an example demonstration of the beam translator shown in FIG. 10A.

FIG. 10A shows an isometric view of an example beam translator 1000. The translator 1000 includes a transparent plate 1002 attached to a motor 1004 that rotates the mirror 1002 back and forth, as indicated by directional arrows 1006 and 1007. The plate 1002 can be composed of glass or a transparent plastic with a desired index of refraction, and the motor 1004 can be a galvanometer motor or a stepper motor. FIG. 10B shows the translator 1000 in operation with the plate 1002 rotated to refract an incident beam of light 1008. In the example of FIG. 10B, the plate 1002 is moved into three different positions 1, 2 and 3, which represent just three of a continuum of positions. Differently patterned lines 1011-1013 represent different substantially parallel paths the beam 1010 is refracted into when the plate 1002 is rotated into the three positions 1, 2 and 3, respectively.

The example beam translators 600, 900 and 1000 also preserve s- and p-polarization of the incident beam (i.e., s-polarization refers to light with electric field component direction perpendicular to the plane of the mirrors 604, 606 and 608). In other words, when a beam is input to the translators 600, 900 and 1000 with either s-polarization or p-polarization, the polarization of the beam is preserved as the beam is reflected off of the mirrors 604, 606 and 608.

Figure 11:
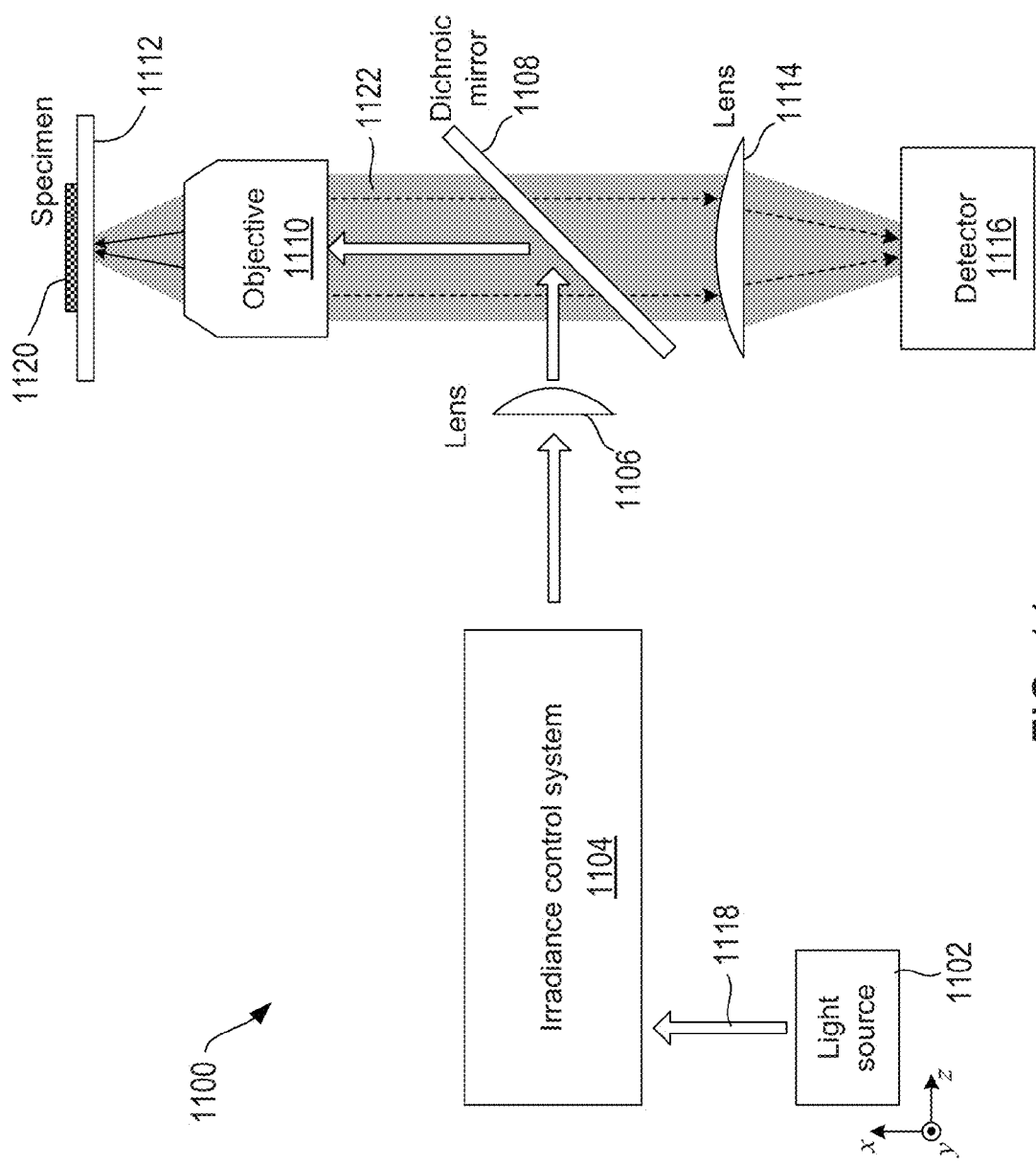
FIG. 11 shows a schematic representation of an example fluorescence microscopy instrument with an incorporated irradiance control system.

ICSs can be incorporated into fluorescent microscopy instruments to control and adjust the irradiance of an excitation beam. FIG. 11 shows a schematic representation of an example fluorescence microscopy instrument 1100. There are many different types of fluorescent microscopy instruments and corresponding optical paths. The instrument 1100 is not intended to represent the optical paths within all the different, well-known variations of fluorescence microscopy instruments, but is instead intended to illustrate the general principals of a fluorescent microscopy instrument that includes an ICS. The instrument 1100 includes a light source 1102, an ICS 1104, a lens 1106, a dichroic mirror 1108, an objective lens 1110, a stage 1112, a lens 1114, and a detector 1116. The light source 1102 can be a laser that emits a collimated, high-intensity, substantially monochromatic beam of excitation light 1118 that stimulates emission of fluorescent light from fluorophores of fluorescent probes that bind to particular materials in a specimen 1120 disposed on the stage 1112. The ICS 1104 is configured and operated as described above with reference to FIG. 1 to receive the excitation beam 1118 and output the excitation beam with a desired and controlled irradiance toward the lens 1106. The lens 1106 focuses the excitation beam and the dichroic mirror 206 reflects the excitation beam into the back of the objective lens 1110. A portion of the fluorescent light emitted from fluorophores in the specimen 1120 are captured and collimated by the objective lens 1110 into a beam, represented by a shaded region 1122, that passes through the dichroic mirror 1108, and is focused onto the detector 1116 by the lens 1114. The detector 1116 can be a photomultiplier, photodiode, or a solid-state charged coupled device ("CCD"). Alternatively, the dichroic mirror 1108 can be configured to transmit the excitation beam and reflect the fluorescent light, in which case the locations of the ICS 1104 and the light source 1102 are switched with the lens 1114 and the detector 1116.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A system to control irradiance of a beam of light, the system comprising:
a beam translator configured to receive a beam of light and to translate the beam substantially perpendicular to a propagation direction of the beam with a desired displacement, the beam translator comprising:
a rotatable mirror attached to a motor;
a first stationary mirror; and
a second stationary mirror;
wherein the rotatable mirror, the first stationary mirror, and the second stationary mirror are positioned so that the beam is reflected twice by the rotatable mirror and once by each of the first stationary mirror and the second stationary mirror to emerge on one of a continuum of substantially parallel paths; and
a beam launch located in the path of the translated beam, the beam launch comprising:
a first plate comprising an aperture defined therein, the first plate configured to receive the translated beam and to attenuate the translated beam based on an amount by which the beam is translated by the beam translator; and
a focusing lens configured to focus the attenuated beam.

2. The system of claim 1, further comprising:
a feedback control electronically connected to the beam translator; and
a splitter located in the path of the attenuated beam, the splitter configured to reflect a first portion of the attenuated beam to the feedback control and to transmit a larger second portion of the attenuated beam, wherein the feedback control is configured to measure irradiance of the first portion of the attenuated beam and to direct the beam translator to translate the beam with the desired displacement based on the irradiance of the first portion of the attenuated beam.

3. The system of claim 1, wherein the beam translator is configured to reflect the beam four times prior to outputting the beam with the desired displacement.

4. The system of claim 1, wherein the beam launch further comprises a single-mode optical fiber, wherein the focusing lens is positioned between the first plate and the fiber, wherein a center of the aperture of the first plate, an optical axis of the focusing lens, and an optical axis of the fiber are aligned with one another, and wherein the fiber is spaced apart from the focusing lens so that a diameter of an acceptance cone of the fiber is approximately equal to a diameter of the aperture of the first plate.

5. The system of claim 1, wherein the beam launch further comprises a second plate comprising a diffraction-limited pinhole aperture defined therein, wherein the focusing lens is positioned between the first plate and the second plate, and wherein a center of the aperture of the first plate, an optical axis of the focusing lens, and a center of the aperture of the second plate are aligned with one another.

6. The system of claim 1, wherein the beam translator is configured to translate the beam with the desired displacement in less than one millisecond.

7. A fluorescent microscopy instrument comprising:
a light source configured to emit a beam of light;
a beam translator configured to receive the beam and to translate the beam substantially perpendicular to a propagation direction of the beam with a desired displacement, the beam translator comprising:
a rotatable mirror attached to a motor;
a first stationary mirror; and
a second stationary mirror;
wherein the rotatable mirror, the first stationary mirror, and the second stationary mirror are positioned so that the beam is reflected twice by the rotatable mirror and once by each of the first stationary mirror and the second stationary mirror to emerge on one of a continuum of substantially parallel paths;
a beam launch located in the path of the translated beam, the beam launch comprising:
a first plate comprising an aperture defined therein, the first plate configured to receive the translated beam and to attenuate the translated beam based on an amount by which the beam is translated by the beam translator; and
a focusing lens configured to focus the attenuated beam; and
an objective lens configured to receive the attenuated beam and to focus the attenuated beam to a focal point within a focal plane of a specimen.

8. The instrument of claim 7, further comprising:
a feedback control electronically connected to the beam translator; and
a splitter located in the path of the attenuated beam, the splitter configured to reflect a first portion of the attenuated beam to the feedback control and to transmit a larger second portion of the attenuated beam, wherein the feedback control is configured to measure irradiance of the first portion of the attenuated beam and to direct the beam translator to translate the beam with the desired displacement based on the irradiance of the first portion of the attenuated beam.

9. The instrument of claim 7, wherein the beam translator is configured to reflect the beam four times prior to outputting the beam with the desired displacement.

10. The instrument of claim 7, wherein the beam launch further comprises a single-mode optical fiber, wherein the focusing lens is positioned between the first plate and the fiber, wherein a center of the aperture of the first plate, an optical axis of the focusing lens, and an optical axis of the fiber are aligned with one another, and wherein the fiber is spaced apart from the focusing lens so that a diameter of an acceptance cone of the fiber is approximately equal to a diameter of the aperture of the first plate.

11. The instrument of claim 7, wherein the beam launch further comprises a second plate comprising a diffraction-limited pinhole aperture defined therein, wherein the focusing lens is positioned between the first plate and the second plate, and wherein a center of the aperture of the first plate, an optical axis of the focusing lens, and a center of the aperture of the second plate are aligned with one another.

12. The instrument of claim 7, wherein the beam translator is configured to translate the beam with the desired displacement in less than one millisecond.

13. A system to control irradiance of a beam of light, the system comprising:
a beam translator configured to receive a beam of light and to translate the beam substantially perpendicular to a propagation direction of the beam with a desired displacement, the beam translator comprising:
a rotatable mirror attached to a motor;
a first stationary mirror; and
a second stationary mirror;
wherein the rotatable mirror, the first stationary mirror, and the second stationary mirror are positioned so that the beam is reflected twice by the rotatable mirror and once by each of the first stationary mirror and the second stationary mirror to emerge on one of a continuum of substantially parallel paths; and
a beam launch located in the path of the translated beam, the beam launch configured to receive the translated beam and to attenuate the translated beam based on an amount by which the beam is translated by the beam translator.

14. The system of claim 13, wherein the beam launch comprises:
a first plate comprising an aperture defined therein, the first plate configured to receive the translated beam and to attenuate the translated beam based on the amount by which the beam is translated by the beam translator; and
a focusing lens configured to focus the attenuated beam.

15. The system of claim 14, wherein the beam launch further comprises a single-mode optical fiber, and wherein the focusing lens is positioned between the first plate and the fiber.

16. The system of claim 15, wherein a center of the aperture of the first plate, an optical axis of the focusing lens, and an optical axis of the fiber are aligned with one another.

17. The system of claim 16, wherein the fiber is spaced apart from the focusing lens so that a diameter of an acceptance cone of the fiber is approximately equal to a diameter of the aperture of the first plate.

18. The system of claim 13, further comprising:
a feedback control electronically connected to the beam translator; and
a splitter located in the path of the attenuated beam, the splitter configured to reflect a first portion of the attenuated beam to the feedback control and to transmit a larger second portion of the attenuated beam, wherein the feedback control is configured to measure irradiance of the first portion of the attenuated beam and to direct the beam translator to translate the beam with the desired displacement based on the irradiance of the first portion of the attenuated beam.

19. The system of claim 13, wherein the beam translator is configured to reflect the beam four times prior to outputting the beam with the desired displacement.

20. The system of claim 13, wherein the beam translator is configured to translate the beam with the desired displacement in less than one millisecond.

* * * * *